United States Patent
Chu

Patent Number: 6,095,160
Date of Patent: Aug. 1, 2000

[54] IN-SITU MAGNETRON ASSISTED DC PLASMA ETCHING APPARATUS AND METHOD FOR CLEANING MAGNETIC RECORDING DISKS

[76] Inventor: Xi Chu, 42252 Live Oak Cir., Fremont, Calif. 94538

[21] Appl. No.: 09/055,734

[22] Filed: Apr. 6, 1998

[51] Int. Cl.⁷ ...................................................... C25F 3/02
[52] U.S. Cl. ................ 134/1.1; 204/192.12; 204/192.2; 204/192.32; 204/156; 216/22
[58] Field of Search ................ 134/1.1, 21, 31; 216/22, 37, 64, 67, 77; 427/458, 471, 523, 524, 528, 532, 534, 535, 571, 576, 598, 599, 127–132, 207.1, 208, 250, 255.1, 255.4, 294, 307, 404; 204/156, 192.1, 192.12, 192.15, 192.3, 192.35, 298.01, 298.02, 298.16, 298.19, 298.21, 298.31, 298.33, 298.34, 298.37

[56] References Cited

U.S. PATENT DOCUMENTS

| | | | |
|---|---|---|---|
| 4,090,941 | 5/1978 | Wright et al. | 204/298.16 |
| 4,581,118 | 4/1986 | Class et al. | 118/623 |
| 4,724,169 | 2/1988 | Keem et al. | 204/192.16 |
| 4,833,043 | 5/1989 | Gardner | 365/122 |
| 4,900,397 | 2/1990 | Werner et al. | 156/643 |
| 4,941,915 | 7/1990 | Matsuoka et al. | 204/192.11 |
| 5,110,438 | 5/1992 | Ohmi et al. | 156/345 |
| 5,298,137 | 3/1994 | Marshall, III | 204/298.06 |
| 5,490,910 | 2/1996 | Nelson et al. | 204/192.22 |
| 5,624,725 | 4/1997 | Nelson et al. | 428/457 |
| 5,707,705 | 1/1998 | Nelson et al. | 204/192.1 |
| 5,741,405 | 4/1998 | Statnikov et al. | 204/192.12 |
| 5,772,858 | 6/1998 | Tepman | 204/298.08 |
| 5,830,327 | 11/1998 | Kolenkow | 204/298.19 |
| 5,846,328 | 12/1998 | Aruga et al. | 118/719 |

*Primary Examiner*—Randy Gulakowski
*Assistant Examiner*—Allan Olsen
*Attorney, Agent, or Firm*—Townsend and Townsend and Crew LLP

[57] ABSTRACT

A method for cleaning the surface of magnetic disks prior to the deposition of a metal layer on the magnetic disk. The method includes the steps of first, placing a magnetic disk into a magnetron assisted DC plasma chamber. The plasma chamber includes a vacuum chamber, one or more targets, one or more magnets, a noble gas source, a target power supply, and a DC bias power supply. Next, a noble gas, for example argon, is introduced into the vacuum chamber via the noble gas source, and a DC glow discharge is generated in the vacuum chamber by supplying power to the one or more targets using the target power supply. Finally, the magnetic disk is etched when a negative voltage is applied to the magnetic disk using the DC bias power supply.

31 Claims, 2 Drawing Sheets

IN-SITU MAGNETRON ASSISTED DC PLASMA ETCHING APPARATUS AND METHOD FOR CLEANING MAGNETIC RECORDING DISKS

BACKGROUND OF THE INVENTION

The present invention relates generally to methods and apparatus for cleaning disks, and more specifically to a novel in-situ magnetron assisted DC plasma etching apparatus and method for cleaning magnetic recording disks.

Magnetic recording disks are well known in the art. Typical hard disk magnetic recording disks comprise a disk-shaped aluminum substrate having a lower, non-magnetic layer such as Ni—P, a chromium-containing intermediate layer, an upper ferromagnetic metal layer, and a carbon-based protective over coating.

In the known disk-shaped recording media which have a ferromagnetic metal film as the magnetic film, the substrates generally consist of aluminum or aluminum alloys. For the production of these thin-film magnetic disks, in a first step, the aluminum substrates are typically coated with a hard, non-magnetic amorphous (Ni—P) lower film or layer. The great hardness of the lower layer improves the tribological properties of the magnetic disks and makes it possible, in a subsequent surface treatment step, to obtain a defined surface roughness which is necessary for reproducible flight behavior of the head and prevents sticking of the head to the magnetic disk.

To ensure optimum adhesion of the intermediate chromium layer to the lower amorphous layer, the amorphous (Ni—P) layer is typically polished and/or textured. After this polishing/texturizing step, the surface of the lower amorphous film is typically cleaned using various mechanical and chemical cleaning methods to remove abraded material and residues of the abrasive. However, small traces of organic and inorganic contaminants, such as dust particles from the air, bacteria from the washing tanks, and polishing residue remain on the disks, leading to poor adhesion between the intermediate chromium layer and the Al/(Ni—P) substrate. The poor adhesion can lead to delamination of the chromium layer and, thus, failure of the disk.

Cleaning the disk surfaces using sputter etching techniques is desirable. Various entities have attempted to use both DC and RF glow discharge techniques to clean disk surfaces. However, none of these attempts have been particularly successful. The DC and RF glow discharge techniques known in the prior art have a tendency to negatively affect the magnetic properties of the disks. In particular, the prior art techniques generally require high pressure and bias voltage. High pressure means that more gas atoms are around the disk, so the particles/atoms sputtered off the disk surface are more likely to collide with a gas atom and be bounced back to the disk surface; so called back scattering effect. In addition, high gas pressure in the etching chamber slows down the overall process because it requires longer gas pumping time before the disk can be sent to the next processing step, thus adversely affecting the overall system throughout.

Moreover, high bias voltage can cause surface damage, stressed surface, and trapped gases on the disk, which can lead to changes in the overall magnetic properties of the etched disk.

Finally, the other prior art etching processes also involve using reactive gases such as Oxygen, which are effective in removing hydrocarbons on the disks but also leave an undesired oxidized metal disk surface.

SUMMARY OF THE INVENTION

Accordingly, it is an advantage of the present invention to provide methods and apparatus for cleaning magnetic disks which overcome the shortcomings of the prior art.

Another advantage of the present invention is that the DC plasma etching technique disclosed herein effectively sputter cleans the disk substrate surface prior to depositing the metal (chromium) layer so as to prevent delamination of the metal layer without affecting the magnetic properties of the disk.

Yet another advantage of the present invention is that the magnetron assisted DC plasma system of the present invention allows the etching process to be carried out at low chamber pressure.

Still another advantage of the present invention is that the low chamber pressure and disk bias configuration helps prevent the etched contaminants from redepositing back onto the surface of the disk, and minimizes the atomic alteration of the disk surface, thus maintaining the magnetic characteristics of the disk.

Yet another advantage of the present invention is that the DC plasma etching technique disclosed herein enhances the physical bonding of the sputtered layers to the disk surface.

The above and other advantages of the present invention are carried out in one form by a novel method for cleaning magnetic disks prior to the deposition of a metal layer onto the disks. The method of the present invention includes the steps of first, placing a magnetic disk into a magnetron assisted DC plasma chamber comprising a vacuum chamber, at least one target, at least one magnet, a noble gas source, a target power supply, and a DC bias power supply.

Next, a noble gas, for example argon, is introduced into the vacuum chamber via the noble gas source, and a DC glow discharge is generated in the vacuum chamber by supplying power to the at least one target using the target power supply. Finally, the magnetic disk is etched when a negative voltage is applied to the magnetic disk using the DC bias power supply.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DESCRIPTION OF THE PREFERRED EMBODIMENT

The present invention is a method and apparatus for sputter etching the surface of a magnetic disk substrate prior to the deposition of a metal layer, for example chromium, onto the disk substrate surface. While a preferred embodiment discussed herein discusses etching a disk substrate and placing a chromium layer on the disk substrate, one skilled in the art will appreciate that the disk substrate discussed herein comprises an aluminum based substrate having a nickel based layer thereon. In addition, while the present invention is described herein as having two targets, one skilled in the art will appreciate that any suitable number of targets may be utilized. For example, the device may have only one target and, thus, only one side of a disk is processed at a time.

Figure 1:
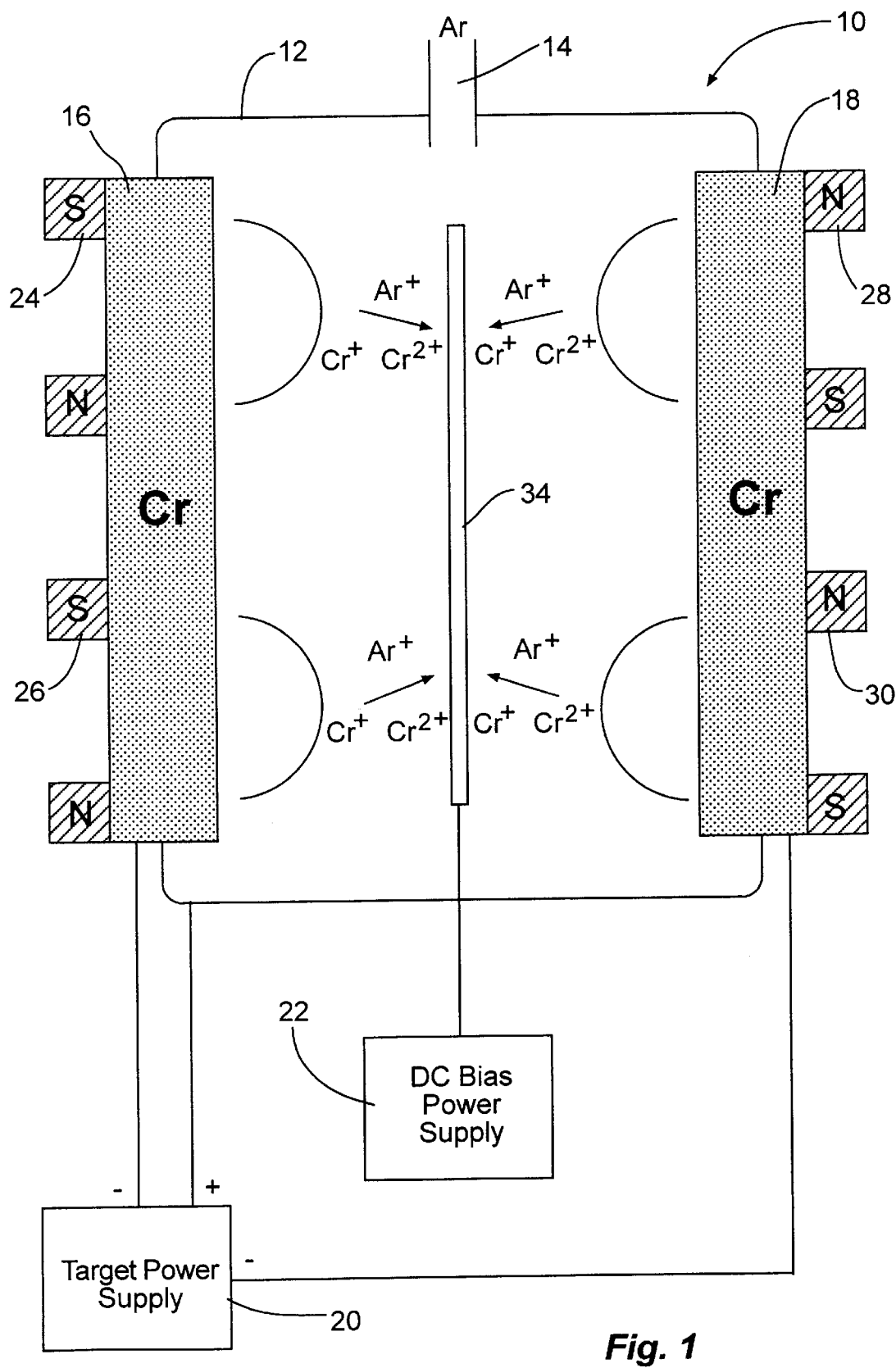
FIG. 1 is a side cross-sectional view of a magnetron assisted DC plasma chamber.

Referring now to FIG. 1, a magnetron assisted DC plasma etching chamber 10 used in the present invention is illustrated. Etching chamber 10 preferably comprises a vacuum chamber 12, a noble gas source 14, a first target 16, a second target 18, a target power supply 20, and a DC bias power supply 22.

First and second targets 16, 18 preferably are circular shaped chromium targets which preferably are located on opposite sides of vacuum chamber 12. In addition, first target 16 preferably comprises a first magnet 24 and a second magnet 26 located on the outside of the target. Similarly, second target 18 preferably comprises a third magnet 28 and a fourth magnet 30 suitably connected thereto. In accordance with a preferred embodiment of the present invention magnets 24–30 are electromagnets; however, as one skilled in the art will appreciate, other suitable magnets may be used. As discussed in more detail below, magnets 24, 26, 28, and 30 suitably produce magnetic fields which help trap electrons near the target from which they were emitted, thus increasing their ionizing effect.

Target power supply 20 is configured to apply a negative voltage to targets 16, 18. In accordance with this aspect of the invention, targets 16, 18 act as the cathode of the electrical circuit, and vacuum chamber 12 acts as the anode. While the illustrated embodiment (FIG. 1) shows one to target power supply 20 applying a negative voltage to both targets 16, 18, one skilled in the art will appreciate that more than one target power supply may be utilized. Thus, the present invention is not limited to the illustrated embodiment.

DC bias power supply 22 preferably is connected to a disk 34 which is to be etched, and which resides proximate the center of vacuum chamber 12. As discussed in more detail below, during operation, DC bias power supply 22 supplies a negative voltage to disk 34.

Referring still to FIG. 1, the operation of etching chamber 10, and a suitable method for etching disk 34 will now be described. Specifically, to etch a magnetic disk 34 in etching chamber 10, disk 34 is introduced into vacuum chamber 12 near the center of vacuum chamber 12. A noble gas is then introduced into vacuum chamber 12. In accordance with a preferred embodiment of the invention, the noble gas is argon and it is introduced into vacuum chamber 12 to a pressure in the range of about 3 mTorr to about 30 mTorr and more preferably in the range of about 20 mTorr to about 25 mTorr.

When the argon is at the appropriate pressure within vacuum chamber 12, a DC glow discharge is created in vacuum chamber 12 in front of targets 16, 18 by igniting the plasma in front of the targets. This is accomplished by applying power to targets 16, 18 using target power supply 20. In accordance with a preferred embodiment of the invention, power in the range of about 20 Watts to about 200 Watts and more preferably about 50 Watts is applied to each target. In supplying power to each target, a negative voltage is applied to targets 16, 18. As mentioned briefly above, targets 16, 18 act as the circuit cathode and the wall of vacuum chamber 12 acts as the circuit anode. In accordance with this aspect of the invention, the voltage drop applied between target cathodes 16, 18 and the anode is in the range of about 150 volts to about 300 volts and more preferably about 200 volts.

As mentioned above, magnets 24 and 26 preferably are connected to first target 16 and magnets 28 and 30 are preferably connected to second target 18. In accordance with this aspect of the invention, magnets 24–30 preferably apply magnetic fields near targets 16, 18, which effectively trap electrons near the target and, thus, increase their ionizing effect in the glow discharges. In accordance with a preferred embodiment of the invention magnets 24–30 suitably create a magnetic field at the surface of the target having a component parallel to the target which has a magnetic field intensity in the range of about 200 Gauss to be about 800 Gauss and preferably above 300 Gauss, and more preferably about 400 Gauss.

To complete the etching circuit, a negative voltage preferably is applied to disk 34 using DC bias power supply 22. In accordance with this aspect of the invention, a negative voltage in the range of about −200 volts to about 800 volts, and more preferably about −400 volts is applied to disk 34.

To start the glow discharge process, power is supplied to targets 16, 18 which creates electric fields near the target that accelerate electrons away from the targets 16, 18. The accelerated electrons in turn collide with the argon atoms in vacuum chamber 12, breaking them up into argon ions and more electrons. This process continues until the glow discharges are created in vacuum chamber 12. The charged particles thus produced by the glow discharge are accelerated by the electric field, the electrons moving toward the anode (causing more ionization on the way) and the argon ions moving toward the cathode, so that a current I flows.

When the argon ions strike the metal target cathodes 16, 18, they may sputter some of the target atoms off, either in complete or ionized form. In accordance with a preferred embodiment of the invention, the target is a chromium target, and the sputtered target atoms are chromium atoms and ions, such as Cr, $Cr^+$, and $Cr^{2+}$ atoms. The ions striking the target may also liberate secondary electrons from the target which continue the argon ionization process and, thus, sustain the glow discharge. In addition, as mentioned briefly above, the magnetic fields created by magnets 24–30 on targets 16, 18 also help sustain the glow discharge by effectively trapping the electrons near the surfaces of targets 16, 18, thus increasing their ionization effect.

The sputtered metal atoms from the target typically fly off in random directions, and some of them land on the surface of disk 34. In addition, because disk 34 is at a relatively high negative potential, some of the argon ions from the glow discharge, as well as the chromium ions from targets 16, 18 will be attracted to the surfaces of disk 34 and will collide therewith. The collision of the metal atoms and the noble gas and metal ions typically knock loosely bonded surface particles away from the surfaces of disk 34, thus sputter etching or cleaning the disk surfaces. Such surface particles cleaned from the disk surfaces may include dust particles, bacteria, polishing residue, and the like. In accordance with a preferred embodiment of the invention, this sputter etching or cleaning process lasts about 1–60 seconds and more preferably about 3–5 seconds. Also, the etching process may be repeated in multiple etching chambers, thus the total etching time of the disk may be lower, depending on the number of different chambers used.

In accordance with another aspect of the present invention, after the etching process is completed, apparatus 10 may be used to deposit a thin layer of metal onto the surfaces of disk 34. In accordance with this aspect of the present invention, the DC power supplied to metal targets 16, 18 is preferably increased from a power of about 20–200

Watts to a power of about 0.5 to about 1.1 kWatts and preferably about 1 kwatt for a period of about 1 to about 3 seconds. The negative bias voltage applied to disk 34 preferably remains about the same.

Figure 2:
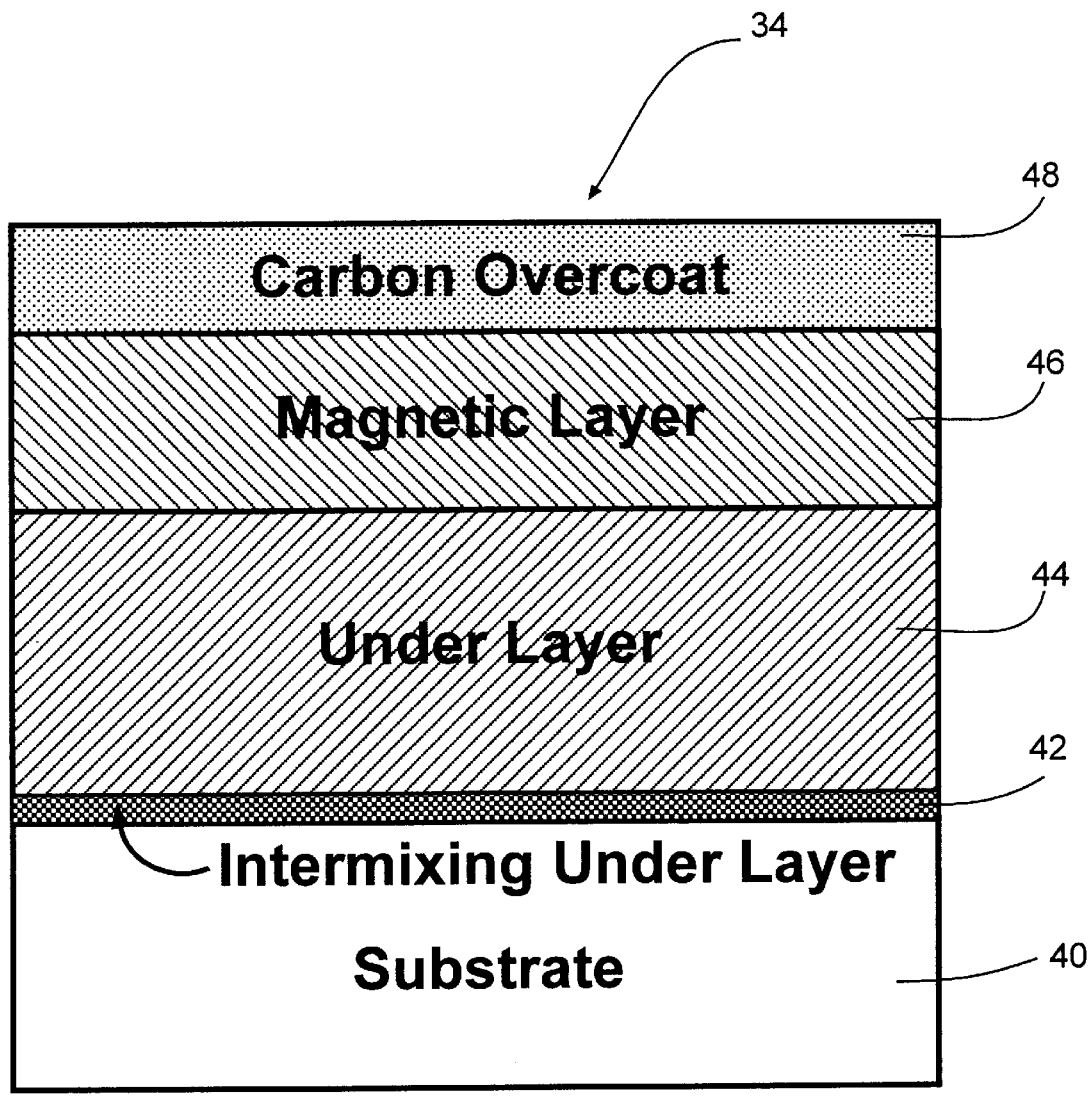
FIG. 2 is an exploded side cross-sectional view of a portion of a magnetic disk, showing the different layers thereon.

By increasing the power supplied to metal targets 16, 18, the amount of metal neutral atom flux from the targets will increase, resulting in a deposition of a metal film on the disk. In addition, because a negative bias voltage is still being applied to disk 34, metal and argon ions will continue to bombard the disk surfaces. This bombardment of metal and argon ions will sputter off any metal neutral atoms which are poorly adhered to the disk surfaces. In addition, this ion bombardment will increase the metal atom packing density on the disk surfaces and will intermix the metal atoms with the disk substrate surface atoms, resulting in a higher adhesion of the metal atoms. This process creates an intermixed layer 42 (see FIG. 2) of metal and substrate which has superior bonding properties than the typical aluminum/nickel-layer substrate. Therefore, when the thicker metal layer is deposited on layer 42, the chances of the metal layer delaminating from the substrate are greatly reduced.

In addition, as discussed above, the DC sputter etching system disclosed herein is conducted at relatively low pressure and low target bias. Typically, as the chamber pressure is lowered, the target bias must be increased to maintain the glow discharge. However, with the present invention, the use of magnets 24–30 helps maintain the glow discharge, even at relatively low target bias and pressure. Accordingly, the low target bias allows the disk substrate surface to be etched at a rate which will clean the disk surfaces, but will not alter the structural integrity of the disk substrate (and nickel-layer thereon). Moreover, because the etching is performed at a relatively low pressure, it is likely that as the contaminates are removed from the disk surface, they will travel away from the disk without colliding with another atom. Thus, etching at the lower pressure greatly increases the likelihood that the contaminates will not be reflected back and redeposit on the disk.

In conclusion, the present invention provides a novel method and apparatus for cleaning magnetic disks using a magnetron assisted DC plasma etching system. While the above is complete description of the preferred embodiments of the present invention, various alternatives, modifications, and equivalents may be used. For example, any suitable number and type of metal targets may be used. Similarly, the type, number and configuration of the magnets may be altered to achieve slightly different glow discharge characteristics. Therefore, the above description should not be taken as limiting the scope of the invention which is defined by the appended claims.

What is claimed is:

1. A method for cleaning magnetic disks having magnetic characteristics in a magnetron assisted DC plasma chamber comprising a low pressure vacuum chamber, at least one target, at least one magnet disposed adjacent to said at least one target, a noble gas source, a target power supply, and a DC bias power supply, said method comprising the steps of:

placing a magnetic disk having magnetic characteristics in said magnetron assisted DC plasma chamber;

introducing a noble gas into said low pressure vacuum chamber via said noble gas source;

generating a DC glow discharge in said low pressure vacuum chamber comprising noble gas ions and target ions by supplying power using said target power supply to said at least one target, wherein electrons are concentrated near a surface of said at least one target; and etching said magnetic disk by applying a negative voltage in the range of −200 volts to −800 volts to said magnetic disk using said DC bias power supply so that said target ions and said noble gas ions collide with a surface of said magnetic disk causing surface particles to be knocked loose from said magnetic disk, wherein said negative voltage range and said low pressure noble gas minimize atomic alteration of said magnetic disk thereby maintaining said magnetic characteristics.

2. The method as recited in claim 1 wherein said noble gas is argon, and said argon is introduced into said vacuum chamber to maintain a pressure in said vacuum chamber in the range of 4 mTorr to 30 mTorr.

3. The method as recited in claim 1 wherein said power supplied to said at least one target is in the range of 20 Watts to 200 Watts.

4. The method as recited in claim 1 wherein said DC plasma chamber comprises two targets, and wherein at least two magnets are disposed adjacent to each of said two targets.

5. The method as recited in claim 1 wherein said at least one magnet is an electromagnet.

6. The method as recited in claim 1 wherein said magnetic disk comprises a substrate, and the method further comprises the step of:

at the end of said etching step, forming an intermixed layer of substrate and metal on a surface of said magnetic disk by increasing the power supplied to said target to a power in the range of 0.5 kWatts to 1 kwatt for a time period in the range of 1 second to 3 seconds.

7. A method for cleaning magnetic disks having magnetic characteristics in a magnetron assisted DC plasma chamber comprising a low pressure vacuum chamber, at least one target, at least one magnet disposed adjacent to said least one target, a noble gas source, a target power supply, and a DC bias power supply, said method comprising the steps of:

placing a magnetic disk having magnetic characteristics in said magnetron assisted DC plasma chamber;

using said noble gas source, introducing a noble gas into said vacuum chamber to maintain a pressure in said vacuum chamber in the range of 4 mTorr to 30 mTorr;

generating a DC glow discharge in said vacuum chamber comprising noble gas ions and target ions by supplying power in the range of 5 Watts to 100 Watts using said target power supply to said at least one target, wherein electrons ate concentrated near a surface of said at least one target; and etching said magnetic disk for a time period in the range of 1 second to 5 seconds by applying a negative voltage to said magnetic disk in the range of −200 volts to −800 volts using said DC bias power supply so that said target ions and said noble gas ions collide with a surface of said magnetic disk causing surface particles to be knocked loose from said magnetic disk, wherein said negative voltage range, said low pressure noble gas and said low power target supply minimize atomic alteration of said magnetic disk thereby maintaining said magnetic characteristics.

8. The method as recited in claim 7 wherein said magnetic disk comprises a substrate, and the method further comprises the step of:

at the end of said etching step, forming an intermixed layer of substrate and metal on a surface of said magnetic disk by increasing the power supplied to said target to a power in the range of 0.5 kWatts to 1 kWatt for a time period in the range of 1 second to 3 seconds.

9. The method as recited in claim 8 wherein said target is a chromium target and said substrate comprises aluminum having a nickel-containing layer thereon, and wherein said intermixed layer comprises a combination of chromium atoms intermixed with said substrate atoms.

10. The method as recited in claim 8 wherein the thickness of said intermixed layer is in the range of 10 Angstroms to 30 Angstroms.

11. The method as recited in claim 7 wherein the strength of the magnetic field created by said at least one magnet is in the range of 200 Gauss to 600 Gauss.

12. The method as recited in claim 11 wherein the strength of the magnetic field created by said at least one magnet is 400 Gauss.

13. The method as recited in claim 4 wherein 50 Watts of power is supplied to said target.

14. The method as recited in claim 7 wherein a negative voltage of −400 volts is applied to said magnetic disk.

15. The method as recited in claim 7 wherein said noble gas is argon.

16. The method as recited in claim 7 wherein said target is a chromium target.

17. The method as recited in claim 7 therein said DC plasma chamber comprises at least two targets, and wherein at least two magnets are disposed adjacent to each one of said at least two targets.

18. A method for cleaning a magnetic disk having magnetic characteristics and forming an intermixed layer of metal and substrate on a surface of said metal disk, wherein said method is performed in a magnetron assisted DC plasma chamber comprising a low pressure, vacuum chamber, at least one target, at least one magnet, a noble gas source, a target power supply, and a DC bias power supply, said method comprising the steps of placing a magnetic disk having magnetic characteristics in said magnetron assisted DC plasma chamber;

using said noble gas source, introducing a noble gas into said vacuum chamber to maintain a pressure in said vacuum chamber in the range of 4 mTorr to 30 mTorr;

generating a DC glow discharge comprising noble gas ions and target ions in said vacuum chamber by supplying power in the range of 20 Watts to 200 Watts to said at least one target using said target power supply;

etching said magnetic disk for a time period in the range of 1 second to 5 seconds by applying a negative voltage to said magnetic disk in the range of −200 volts to −800 volts using said DC bias power supply so that said target ions and said noble gas ions collide with a surface of said magnetic disk causing surface particles to be knocked loose from said magnetic disk; and forming an intermixed layer of substrate and metal on a surface of said magnetic disk by increasing the power supplied to said target to a power in the range of 0.5 kWatts to 1 kWatt for a time period in the range of 1 second to 3 seconds.

19. The method as recited in claim 18 wherein said target is a chromium target and said substrate comprises aluminum having a nickel-containing layer thereon, and wherein said intermixed layer comprises a combination of chromium atoms intermixed with said substrate atoms.

20. The method as recited in claim 18 wherein the thickness of said intermixed layer is in the range of 10 Angstroms to 30 Angstroms.

21. The method as recited in claim 18 wherein the strength of the magnetic field created by said at least one magnet is in the range of 200 Gauss to 600 Gauss.

22. The method as recited in claim 18 wherein said noble gas is argon.

23. The method as recited in claim 18 wherein said DC plasma chamber comprises at least two targets, and wherein each one of said at least two targets comprises at least two magnets.

24. A method for cleaning magnetic disks having magnetic characteristics in a magnetron assisted DC plasma chamber comprising a low pressure vacuum chamber, at least two targets, at least two magnets, a noble gas source, a target power supply, and a DC bias power supply, said method comprising the steps of:

placing a magnetic disk having magnetic characteristics in said magnetron assisted DC plasma chamber;

introducing a noble gas into said low pressure vacuum chamber via said noble gas source;

generating a DC glow discharge comprising noble gas ions and target ions in said low pressure vacuum chamber by supplying power using said target power supply to said at least two targets comprising said at least two magnets on each of said at least two targets; and etching said magnetic disk by applying a negative voltage in the range of −200 volts to −800 volts to said magnetic disk using said DC bias power supply, wherein said target ions and said noble gas ions collide with a surface of said magnetic disk causing surface particles to be knocked loose from said magnetic disk.

25. The method as recited in claim 24 wherein said noble gas is argon, and said argon is introduced into said vacuum chamber until said vacuum chamber has a pressure in the range of 4 mTorr to 30 mTorr.

26. The method as recited in claim 24 wherein said power supplied to said at least two targets is in the range of 20 Watts to 200 Watts.

27. The method as recited in claim 24 wherein said at least two magnets are electromagnets.

28. The method as recited in claim 24 wherein said at least two targets are metal targets.

29. The method as recited in claim 28 wherein said at least two targets are chromium targets.

30. The method as recited in claim 24 wherein said magnetic disk comprises a substrate, and the method further comprises the step of:

at the end of said etching step, forming an intermixed layer of substrate and metal on a surface of said magnetic disk by increasing the power supplied to said at least two targets to a power in the range of 0.5 kWatts to 1 kWatt for a time period in the range of 1 second to 3 seconds.

31. The method as recited in claim 30 wherein said at least two targets are chromium targets and said substrate comprises aluminum having a nickel-containing layer thereon, and wherein said intermixed layer comprises a combination of chromium atoms intermixed with said substrate atoms.

* * * * *